United States Patent
Baldauf et al.

(10) Patent No.: US 7,150,275 B2
(45) Date of Patent: Dec. 19, 2006

(54) METHOD FOR THE TORQUE-ORIENTED CONTROL OF AN INTERNAL COMBUSTION ENGINE

(75) Inventors: Johannes Baldauf, Wangen (DE); Michael Eckstein, Immenstaad (DE); Christian Rehm, Friedrichshafen (DE); Jorg Remele, Hagnau (DE); Martin Schonle, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 11/072,768

(22) Filed: Mar. 4, 2005

(65) Prior Publication Data
US 2005/0203694 A1   Sep. 15, 2005

(30) Foreign Application Priority Data
Mar. 10, 2004   (DE) ................. 10 2004 011 599

(51) Int. Cl.
F02D 41/00   (2006.01)
F02D 41/30   (2006.01)
(52) U.S. Cl. ........................ 123/681; 123/436
(58) Field of Classification Search ................ 123/486, 123/681, 478, 480, 488, 436
See application file for complete search history.

(56) References Cited

U.S. PATENT DOCUMENTS

| | | | | |
|---|---|---|---|---|
| 6,161,524 A * | 12/2000 | Akbarian et al. | ............ | 123/478 |
| 6,807,939 B1 * | 10/2004 | Doelker et al. | ............. | 123/350 |
| 6,863,051 B1 * | 3/2005 | Doelker et al. | ............. | 123/352 |
| 7,007,463 B1 * | 3/2006 | Shirakawa | ................... | 60/297 |
| 2003/0010324 A1 * | 1/2003 | Joos et al. | ................... | 123/478 |
| 2004/0220717 A1 * | 11/2004 | Jessen | ........................ | 701/104 |
| 2005/0205063 A1 * | 9/2005 | Kolmanovsky et al. | ..... | 123/436 |

FOREIGN PATENT DOCUMENTS

| | | |
|---|---|---|
| DE | 197 39 564 A1 | 3/1999 |
| DE | ED 198 51 457 | 2/2000 |
| DE | 100 00 918 A1 | 7/2001 |
| DE | 10 2004 001 913.4 | 1/2004 |

* cited by examiner

*Primary Examiner*—Mahmoud Gimie
(74) *Attorney, Agent, or Firm*—Klaus P. Stoffel; Wolff & Samson

(57) ABSTRACT

A method for the torque-oriented control of an internal combustion engine in which a set torque is computed from an input variable that represents the desired power, and the set torque is limited to an air mass-dependent maximum torque.

5 Claims, 5 Drawing Sheets

METHOD FOR THE TORQUE-ORIENTED CONTROL OF AN INTERNAL COMBUSTION ENGINE

BACKGROUND OF THE INVENTION

The invention concerns a method for the torque-oriented control of an internal combustion engine.

DE 197 39 564 A1 describes a method for the torque-oriented control of an internal combustion engine, in which a set torque is computed according to the wishes of the driver, and the set torque is limited to a maximum permissible torque. The maximum permissible torque in turn is computed as a function of an accelerator pedal position and the engine speed. The method cannot be applied directly to an internal combustion engine with exhaust turbochargers.

DE 100 00 918 A1 describes a method for the torque-oriented control of an internal combustion engine. In this method, a set torque is computed from an accelerator pedal position and is converted to a set fuel quantity by an input-output map. This set fuel quantity is corrected by a relative efficiency factor. The corrected set fuel quantity in turn is limited to a maximum fuel quantity by means of an input-output map to limit smoke formation. A problem with this torque-based architecture, however, is that the set torque can differ from the actual torque at the power takeoff due to the smoke limitation.

The not yet prepublished German Patent Application with the official file number 10 2004 001 913.4 also describes a method for the torque-oriented control of an internal combustion engine. In this method, the set torque is corrected by a relative friction torque, which is computed essentially from the deviation of the current state of the internal combustion engine from a standard state. The resulting torque is converted by a corresponding input-output (engine) map into a power-determining signal for automatically controlling the internal combustion engine. The effect of an exhaust turbocharger is not described in connection with this method.

SUMMARY OF THE INVENTION

The object of the invention is to provide a method for the torque-oriented control of an internal combustion engine with an exhaust turbocharger.

For an internal combustion engine with an exhaust turbocharger, the invention provides that the set torque is limited by an air mass-dependent maximum torque. The air mass-dependent maximum torque is computed from a fuel quantity and an actual efficiency factor. During the transition from one-supercharger operation to two-supercharger operation, the air mass-dependent maximum torque is computed from a supercharger switch torque. After the expiration of a time interval, the air mass-dependent maximum torque is recomputed according to the current operating state of the engine.

The invention offers the advantages that during non-steady-state operation, e.g., during supercharger switching, the exhaust gas values are improved, and the output torque corresponds to the limited desired torque. This means that the control is always optimally adjusted to the output torque of the engine.

Other features and advantages of the present invention will become apparent from the following description of the invention that refers to the accompanying drawings.

DESCRIPTION OF THE INVENTION

Figure 1:
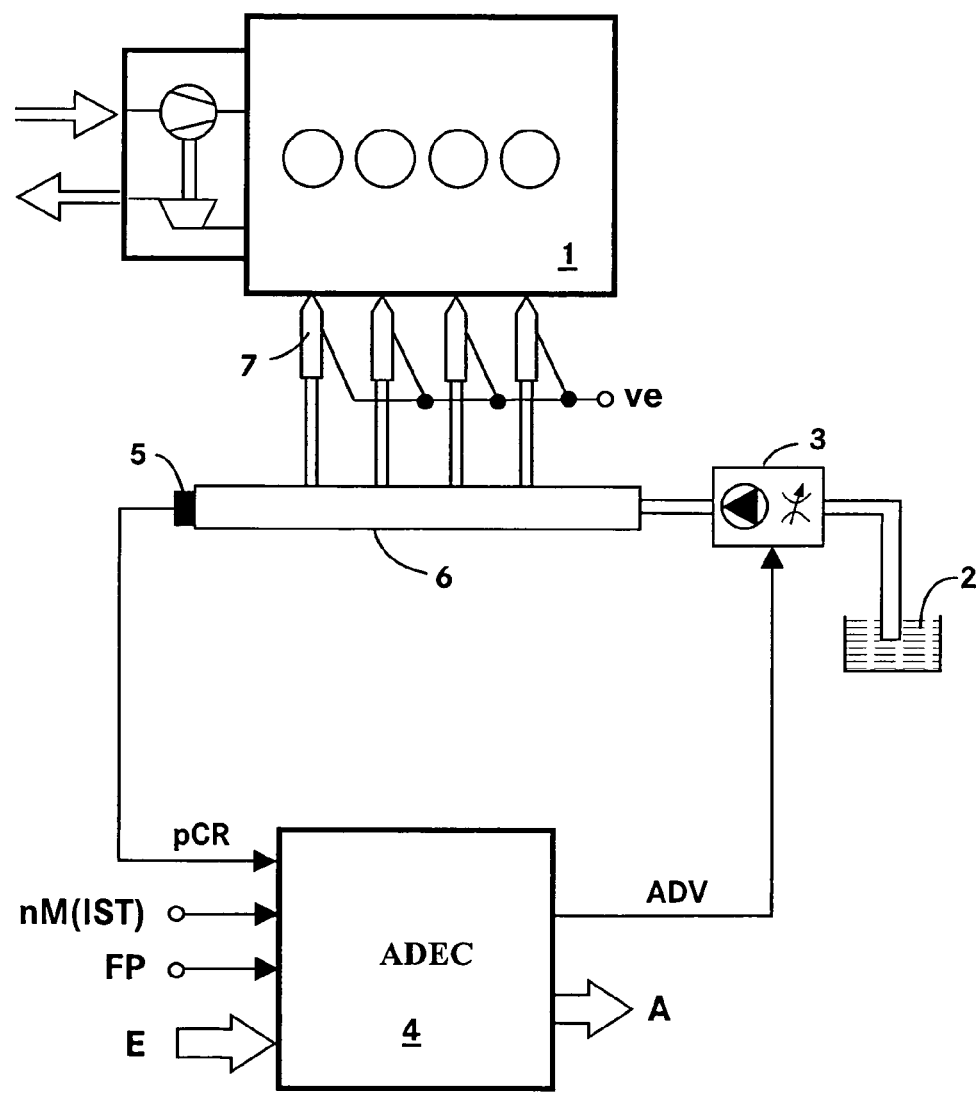
FIG. 1 shows a system diagram.

FIG. 1 shows a system diagram of an internal combustion engine 1 with an electronic control unit 4. In the illustrated internal combustion engine 1, the fuel is injected by a common-rail injection system. This injection system comprises the following components: pumps 3 with a suction throttle for conveying the fuel from a fuel tank 2, a rail 6 for storing the fuel, and injectors 7 for injecting the fuel from the rail 6 into the combustion chambers of the internal combustion engine 1. Instead of the rail 6, it is also possible to use individual accumulators.

The internal combustion engine 1 is automatically controlled by the electronic control unit (ADEC) 4. The electronic control unit 4 contains the usual components of a microcomputer system, for example, a microprocessor, interface adapters, buffers, and memory components (EEPROM, RAM). The relevant operating characteristics for the operation of the internal combustion engine 1 are applied in the memory components in input-output maps/characteristic curves. The electronic control unit 4 uses these to compute the output variables from the input variables. FIG. 1 shows the following input variables as examples: an actual rail pressure pCR, which is measured by means of a rail pressure sensor 5, an actual speed nM(IST) of the internal combustion engine 1, a signal FP for the power presetting by the operator, and an input variable E. Examples of input variables E are the charge air pressure of the turbochargers and the temperatures of the coolant/lubricant and the fuel.

As output variables of the electronic control unit 4, FIG. 1 shows a signal ADV for controlling the suction throttle and an output variable A. The output variable A is representative of the other control signals for automatically controlling the internal combustion engine 1, for example, a power-determining signal ve, here: injection quantity.

Figure 2:
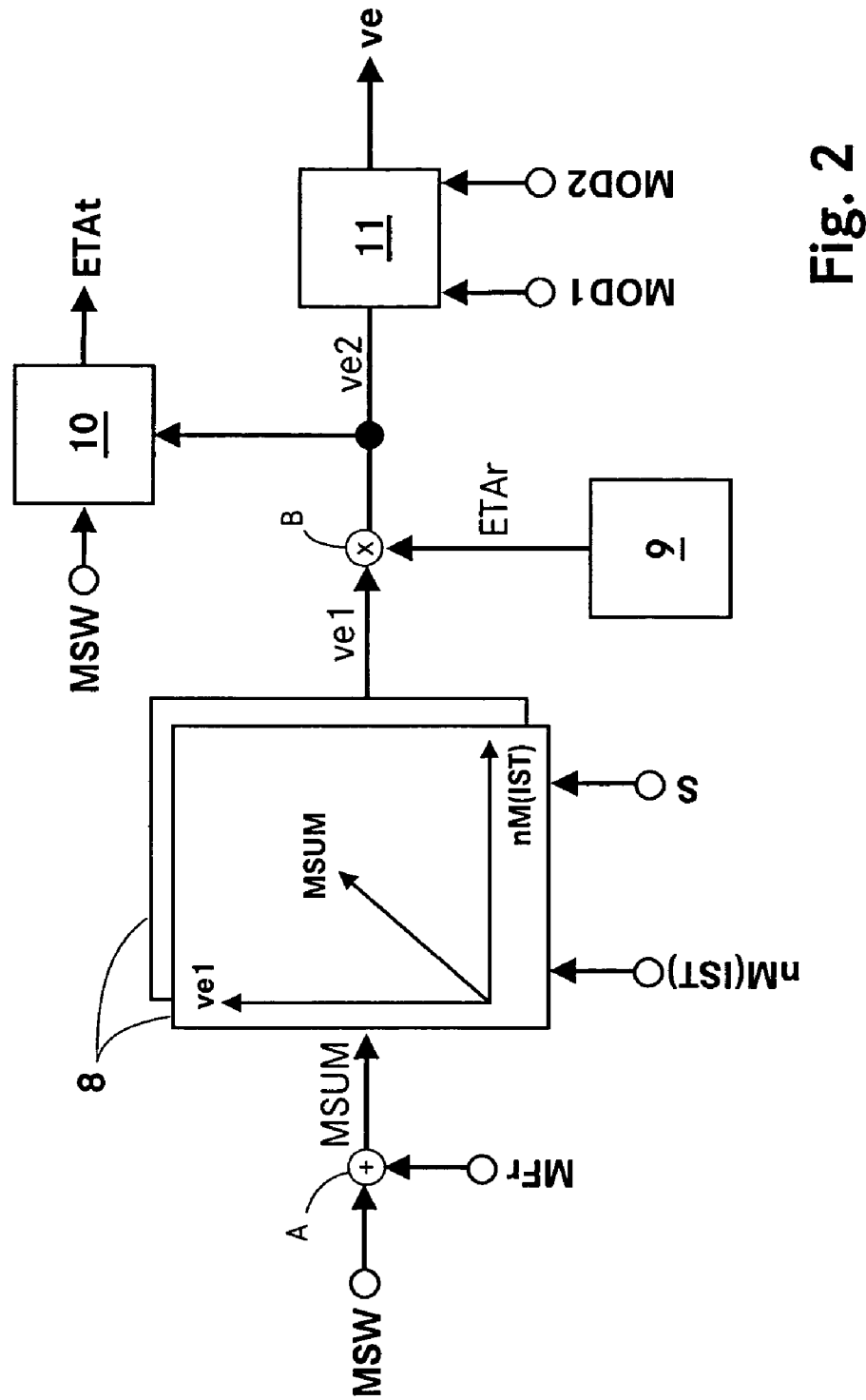
FIG. 2 shows a functional block diagram of the torque-oriented functional architecture.

FIG. 2 shows a functional block diagram of a torque-oriented functional architecture. The input variables are: a set torque MSW, a relative friction torque MFr, the actual speed nM(IST), and a signal S. The output variables are: the power-determining signal ve and an actual efficiency ETAt. The set torque MSW is determined from an input variable that represents the desired power, e.g., the position of the accelerator pedal FP. The set torque MSW and the relative friction torque MFr are added at a point A. The relative friction torque MFr is substantially determined from the deviation of the current state of the internal combustion engine from a standard state. The standard state is preset by the manufacturer of the internal combustion engine on the basis of test stand tests. For an internal combustion engine at running temperature, this standard state is characterized, for example, by an atmospheric pressure of 1,013 hPa, an ambient temperature of 25° C., and a constant fuel temperature. If the internal combustion engine is in the standard state, the relative friction torque is zero. The sum of the set torque MSW and the relative friction torque MFr is the total torque, which is denoted MSUM in FIG. 2. The total torque MSUM is one of the input variables for the input-output map

8. A first power-determining signal ve1 is computed by the input-output map 8 as a function of the actual speed nM(IST) and the total torque MSUM. In practice, the first power-determining signal ve1 corresponds to an injection quantity, whose unit is milligrams/injection. The operator can switch between various input-output maps 8 by means of the signal S. The input-output maps 8 can be designed as an input-output map 8 optimized with respect to exhaust gas or with respect to fuel consumption.

The first power-determining signal ve1 is multiplied by a relative efficiency ETAr at a point B. The relative efficiency ETAr is computed in a functional block 9, e.g., as a function of an air mass, ambient temperature, fuel temperature, atmospheric pressure, and the actual speed. The product of the first power-determining signal ve1 and the relative efficiency ETAr is a second power-determining signal ve2. An actual efficiency ETAt is computed in a functional block 10 from the second power-determining signal ve2 and the set torque MSW. The actual efficiency ETAt is used to compute an air mass-dependent torque limit in accordance with FIG. 3. In the functional block 11, the power-determining signal ve is computed from the second power-determining signal ve2 as a function of a first operating mode MOD1 or a second operating mode MOD2. The operating mode corresponds in practice, e.g., to operation of the internal combustion engine as full engine (MOD1) or half engine (MOD2). In half-engine operation, only half of the cylinders are fired. The power-determining signal ve corresponds to the amount of fuel required to produce the set torque MSW at the power takeoff of the internal combustion engine 1.

Figure 3:
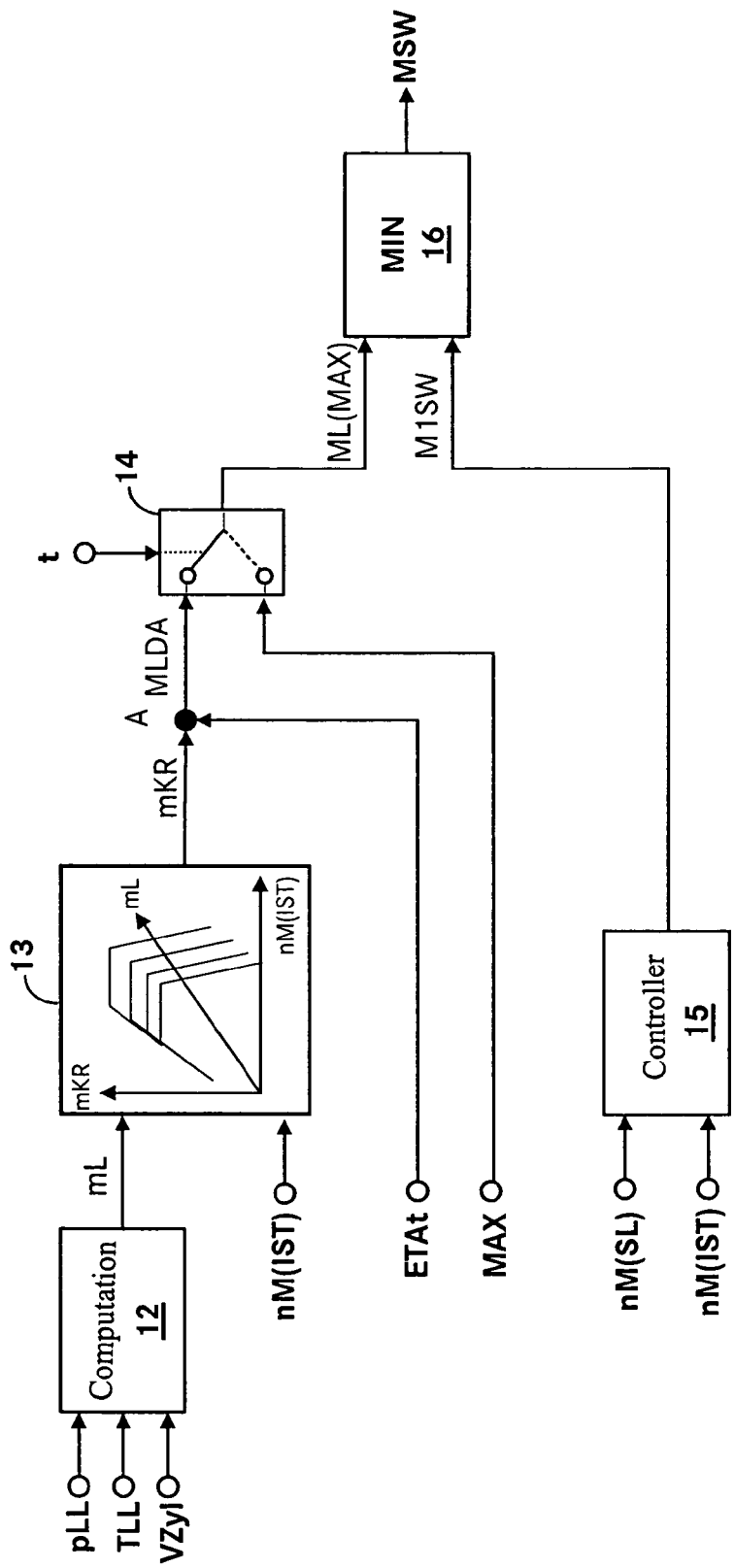
FIG. 3 shows a functional block diagram of the computation of the air mass-dependent maximum torque.

FIG. 3 shows a functional block diagram for the computation of the set torque MSW. The essential elements of the functional block diagram are an air mass computation 12, a fuel mass input-output map 13, a switch 14, a speed controller 15, and a minimum value selector 16. An air mass mL is determined by the gas equation (computation 12) from the input variables charge air pressure pLL, charge air temperature TLL, and piston displacement VZyl. The fuel mass mKR is computed by the input-output map 13 from the air mass mL and the actual speed nM(IST) of the internal combustion engine. The computed fuel mass mKR is multiplied by the actual efficiency ETAt at a point A. The result corresponds to a charge pressure limitation torque MLDA. This is supplied to a first input of the switch 14. A supercharger switch torque MAX is supplied to a second input of the switch 14. The output quantity of the switch 14 corresponds to an air mass-dependent maximum torque ML(MAX). Accordingly, depending on the position of the switch 14, the air mass-dependent maximum torque ML(MAX) corresponds either to the value MLDA or the value MAX. The air mass-dependent maximum torque ML(MAX) is supplied to the minimum value selector 16. A first set torque M1SW is supplied as an additional input variable to the minimum value selector 16. The first set torque M1SW is computed by the speed controller 15 from the control deviation, i.e., the comparison of the set speed to the actual speed of the internal combustion engine. Naturally, the first set torque M1SW can also be derived directly from the position of the accelerator pedal. The output variable of the minimum value selector 16 is the set torque MSW.

The following functionality is represented by the functional block diagram:

In one-supercharger operation, the switch 14 is in the position shown in the functional block diagram, i.e., the air mass-dependent maximum torque ML(MAX) corresponds to the charge pressure limitation torque MLDA, which in turn is computed from the fuel mass mKR and the actual efficiency ETAt. In this position, the first set torque M1SW is limited by the minimum value selector to the value MLDA. When a supercharger switching point is detected, i.e., when a second exhaust turbocharger is activated, the switch 14 switches to the dotted position. In this position, the air mass-dependent maximum torque ML(MAX) corresponds to the supercharger switch torque MAX. Therefore, in this position, the first set torque M1SW is limited to the value MAX. The supercharger switch torque MAX is computed from the charge pressure limitation torque MLDA before the start of the supercharger switching and a factor, which is typically between one and two. After the expiration of a time interval, e.g., 3 seconds, the switch 14 switches back to the original position (solid line).

Figure 4A:
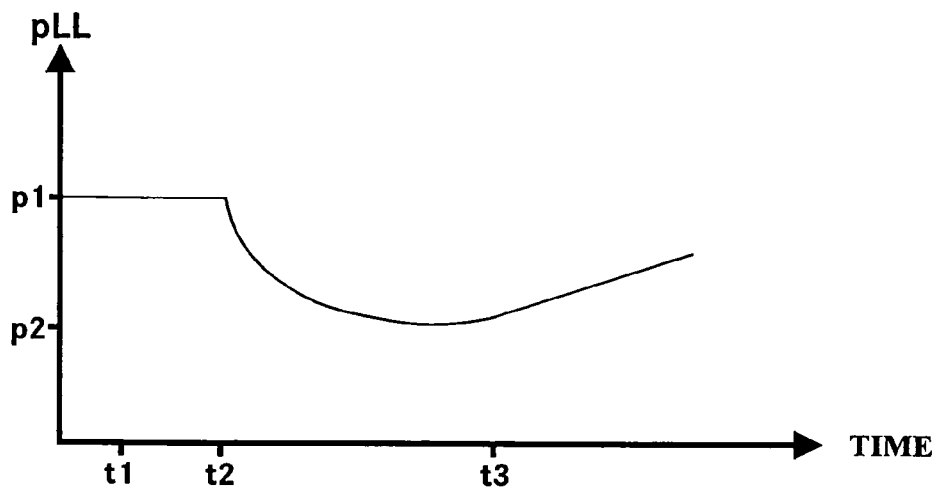
FIG. 4 shows time diagrams.
Figure 4B:
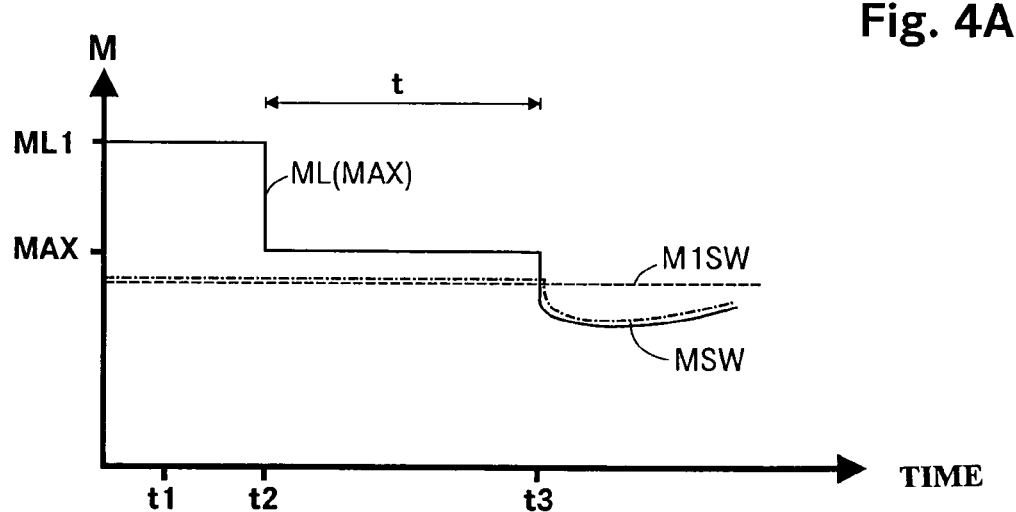

FIG. 4 has two parts, FIGS. 4A and 4B, which show, in each case, as a function of time: the behavior of the charge air pressure pLL (FIG. 4A) and the behavior of the torque (FIG. 4B). FIG. 4B shows the behavior of the air mass-dependent maximum torque ML(MAX) as a solid line, the behavior of the first set torque M1SW as a dotted line, and the behavior of the set torque MSW as a dot-dash line. At time t1, the internal combustion engine is being operated with one exhaust turbocharger, i.e., in one-supercharger operation. The air mass-dependent maximum torque ML(MAX) at this time corresponds to the value ML1. The first set torque M1SW is limited at time t1 to the high value ML1. At time t2, a supercharger switching is initiated, i.e., a second exhaust turbocharger is switched on. Since the exhaust gas volume flow remains constant, the charge air pressure pLL on the primary side drops from pressure level p1 towards pressure level p2 (FIG. 4A). With the initiation of the supercharger switching, the air mass-dependent maximum torque ML(MAX) is set to the supercharger switch torque MAX. This is determined from the last-computed charge pressure limitation torque MLDA before initiation of the supercharger switching and a factor, e.g., 1 to 2. Before the supercharger switching, the air mass-dependent maximum torque ML(MAX) is identical to the charge pressure limitation torque MLDA. Consequently, during the period t2 to t3, the first set torque M1SW is limited to the supercharger switch torque MAX. The time frame t2/t3 corresponds to a predeterminable time interval t, e.g., 3 seconds. After the expiration of the time interval t, at time t3, the air mass-dependent maximum torque ML(MAX) is recomputed by the input-output map 13 and the actual efficiency ETAt. Since the charge air pressure pLL has the value p2 at time t3, the air mass-dependent maximum torque ML(MAX) thus also decreases. In the example illustrated in FIG. 4B, the air mass-dependent maximum torque ML(MAX) falls below the value of the first set torque M1SW. The set torque MSW is then limited by the minimum value selector 16 to the value of the air mass-dependent maximum torque ML(MAX) according to the curve of ML(MAX).

Figure 5:
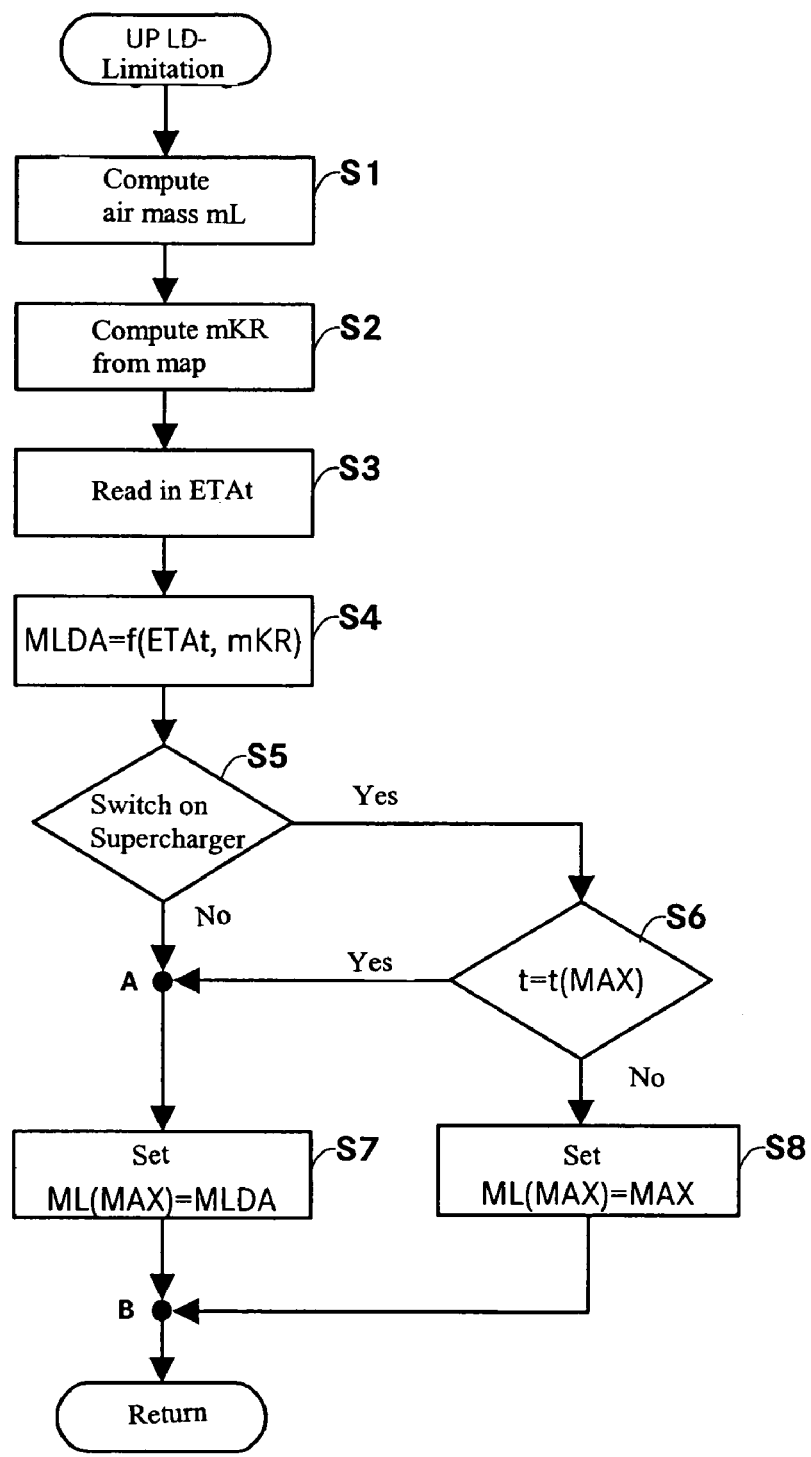
FIG. 5 shows a program flowchart.

FIG. 5 shows a program flowchart of a subprogram for charge pressure limitation. At S1, the gas equation is used to compute an air mass mL from the charge air pressure, the charge air temperature, and the piston displacement. At S2, a fuel mass mKR is computed as a function of the air mass mL by the input-output map 13. The actual efficiency ETAt is then read in at S3. At S4, the charge pressure limitation torque MLDA is determined from the actual efficiency ETAt and the fuel mass mKR by multiplication. At S5 a check is made to determine whether a supercharger switching is initiated. If this is not the case, then the program flows to S7. If a supercharger switching is detected at S5, then a check is performed at S6 to determine whether the time interval t has reached the maximum value tMAX, e.g., 3 seconds. If the time interval t has not yet expired, then at S8 the air mass-dependent maximum torque ML(MAX) is set to the supercharger switch torque MAX, and the program flows to point B. If the check at step S6 shows that the time interval has expired, then the program flows to point A, and at S7 the air mass-dependent maximum torque ML(MAX) is set to the computed value MLDA. The program then returns to the main program.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for torque-oriented control of a supercharged internal combustion engine, comprising the steps of: computing a set torque (MSW) from an input variable that represents a desired power; and determining a power-determining signal (ve) for controlling the driving torque of the internal combustion engine as a function of the set torque (MSW), wherein the set torque (MSW) is limited by an air mass-dependent maximum torque (ML(MAX)), wherein during one-supercharger operation the maximum torque (ML(MAX)) corresponds to charge pressure limitation torque (MLDA), and wherein when an additional exhaust turbocharger is switched on, the maximum torque (ML(MAX)) is determined from a supercharger switch torque (MAX).

2. The method in accordance with claim 1, wherein the charge pressure limitation torque (MLDA) is computed from a fuel mass (mKR) and an actual efficiency factor (ETAt).

3. The method in accordance with claim 2, further including computing fuel mass (mKR) from an input-output map as a function of an air mass (mL) and an actual speed (nm(IST)) of the internal combustion engine.

4. The method in accordance with claim 1, including computing the supercharger switch torque (MAX) from the maximum torque (ML(MAX)) before initiation of the supercharging switching, multiplied by a factor.

5. The method in accordance with claim 1, wherein after expiration of a time interval (t) the maximum torque (ML(MAX)) again corresponds to the charge pressure limitation torque (MLDA), which is computed as a function of fuel mass (mKR) and actual efficiency (ETAt).

* * * * *